US010123327B2

(12) United States Patent
Hu et al.

(10) Patent No.: US 10,123,327 B2
(45) Date of Patent: Nov. 6, 2018

(54) METHOD AND APPARATUS FOR TRANSMITTING AND RECEIVING DATA IN ORTHOGONAL FREQUENCY DIVISION MULTIPLEXING SYSTEM

(75) Inventors: Yang Hu, Beijing (CN); Zhiping Lei, Beijing (CN); Lei Li, Beijing (CN); Jie Mao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/344,926

(22) PCT Filed: Sep. 19, 2011

(86) PCT No.: PCT/CN2011/079829
§ 371 (c)(1),
(2), (4) Date: Mar. 14, 2014

(87) PCT Pub. No.: WO2013/040744
PCT Pub. Date: Mar. 28, 2013

(65) Prior Publication Data
US 2014/0341139 A1  Nov. 20, 2014

(51) Int. Cl.
H04W 72/04 (2009.01)
H04L 5/00 (2006.01)
(Continued)

(52) U.S. Cl.
CPC ....... *H04W 72/0453* (2013.01); *H04L 5/0044* (2013.01); *H04L 5/0094* (2013.01);
(Continued)

(58) Field of Classification Search
CPC ... H04W 72/0446; H04W 84/12; H04W 4/10; H04W 84/08; H04W 74/04; H04W 74/06;
(Continued)

(56) References Cited

U.S. PATENT DOCUMENTS 6,598,200 B1 * 7/2003 Greenwood .......... H03M 13/05
714/774
9,137,807 B2 * 9/2015 Michel ............... H04B 7/15592
(Continued)

FOREIGN PATENT DOCUMENTS

CN 1744727 A 8/2006
CN 101102298 A 1/2008
(Continued)

OTHER PUBLICATIONS

3GPP. "3rd Generation Partnership Project; Technical Specification Group Radio Access Network; Evolved Universal Terrestrial Radio Access (E-UTRA); Physical channels and modulation (Release 10)." Dec. 2010.

*Primary Examiner* — Oussama Roudani
(74) *Attorney, Agent, or Firm* — Sage Patent Group

(57) ABSTRACT

Embodiments of the disclosure provide a method in a source node for transmitting data in an OFDM system in which data are transmitted on frequency bands from the source node to a destination node, the method comprising: selecting a set of frequency bands from available frequency bands in the OFDM system; and transmitting data in frequency domain on the selected set of frequency bands to the destination node. Embodiments of the disclosure further provide a method at a destination node for receiving data in an OFDM system in which data are received on frequency bands from a source node, the method comprising: determining a set of frequency bands of available frequency bands on which data are to be received in frequency domain; and receiving the data on the determined set of frequency bands from the source node. Corresponding apparatuses are also provided.

9 Claims, 10 Drawing Sheets

(51) Int. Cl.
*H04L 27/26* (2006.01)
*H04W 88/08* (2009.01)

(52) U.S. Cl.
CPC .......... *H04L 27/26* (2013.01); *H04L 27/2602* (2013.01); *H04L 27/265* (2013.01); *H04W 88/085* (2013.01)

(58) Field of Classification Search
CPC ............. H04W 28/26; H04W 72/0453; H04W 88/085; H04W 24/02; H04W 84/047; H04W 88/08; H04W 40/22; H04B 1/707; H04B 7/2643; H04B 1/0475; H04B 10/25753; H04B 1/0064; H04L 5/0007; H04L 27/26; H04L 27/2602; H04L 5/0044; H04L 5/0094; H04L 27/2626; H04L 27/2647; H04L 27/0008; H04L 2025/03414; H04L 25/03343; H04L 27/265; H04L 27/2607; H03M 7/30

USPC .......................................................... 370/329

See application file for complete search history.

(56) References Cited

U.S. PATENT DOCUMENTS

| | | | |
|---|---|---|---|
| 2007/0223611 A1* | 9/2007 | Ode | H04L 5/0007 375/260 |
| 2009/0143088 A1* | 6/2009 | Einhaus | H04L 27/2601 455/509 |
| 2009/0221295 A1 | 9/2009 | Sahin et al. | |
| 2009/0268830 A1* | 10/2009 | Birru | H04W 16/14 375/260 |
| 2010/0103863 A1* | 4/2010 | Ulupinar | H04L 29/12207 370/315 |
| 2010/0261504 A1* | 10/2010 | Lukkarila | H04B 1/10 455/561 |
| 2010/0296389 A1 | 11/2010 | Khandekar et al. | |
| 2011/0223958 A1 | 9/2011 | Chen et al. | |
| 2011/0311226 A1* | 12/2011 | Smith | G02B 6/483 398/45 |
| 2012/0147831 A1* | 6/2012 | Golitschek | H04L 1/0026 370/329 |
| 2012/0213261 A1* | 8/2012 | Sayana | H04L 5/0094 375/224 |
| 2012/0250740 A1* | 10/2012 | Ling | H04W 88/085 375/219 |

FOREIGN PATENT DOCUMENTS

| | | |
|---|---|---|
| EP | 1631112 A1 | 1/2006 |
| EP | 1848238 A2 | 10/2007 |

* cited by examiner

METHOD AND APPARATUS FOR TRANSMITTING AND RECEIVING DATA IN ORTHOGONAL FREQUENCY DIVISION MULTIPLEXING SYSTEM

TECHNICAL FIELD

Embodiments of the present disclosure generally relate to communication technology, more particularly, to a method and apparatus for transmitting and receiving data in an Orthogonal Frequency Division Multiplexing (OFDM) system.

BACKGROUND

With the development of communication technology, high speed communication becomes more and more popular in modern communication. Long Term Evolution (LTE) is a technology for realizing high-speed packet-based communication that may achieve high data rates both in a downlink and in an uplink. Specifically, high speed communication is shown in the following aspects:

Wider band: LTE allows for a system bandwidth from 1.4 MHz to 20 MHz, while LTE-Advanced allows for a system bandwidth up to 100 MHz by carrier aggregation (CA).

Multiple antennas: In both LTE and LTE-A, Multiple-Input Multiple-Output (MIMO) is extensively applied to exploit high degrees of freedom in spatial domain, up to 8 layers in the downlink and 4 layers in the uplink.

Modulation technique: The modulation technique or the transmission method used is known as OFDM, which makes frequency resources more efficient.

In an OFDM system, high speed data communication may be occurred between multiple nodes. Usually, a node transmitting data may be called as a source node, and a node receiving data may be called as a destination node. An OFDM system in which data are transmitted from the source node to the destination node may comprise one or more base band units (BBUs) and one or more radio remote units (RRUs). In downlink data communication, a BBU may be considered as a source node, which usually performs base band signal processing and transmits base band signals to RRUs, and a RRU may be considered as a destination node, which usually converts the received data from base band to radio frequency and transmit the radio frequency data over one or more antennas to user terminals. In uplink data communication, a RRU may be considered as a source node and a BBU may be considered as a destination node. Thus, such BBU plus RRU architecture supports the connection between one baseband unit and one or more distributed RRUs.

In a conventional BBU plus RRU architecture, time domain In-phase/Quadrature (I/Q) data are exchanged between a BBU and one or more RRUs, where all baseband processing are centralized in the BBU. It is same for both downlink and uplink. One of challenges for the conventional BBU plus RRU architecture is high and sometimes very high requirement on I/Q transmission rate and bandwidth demand on backhaul. In addition, latency introduced by backhaul could impact on air-interface performance. More specifically, the challenges mainly include the following aspects (here, 15 bits per I or Q signal and 30.72e6 bps sample rate is assumed):

Wider band support typically requires higher transmission rate. For instance, in LTE with 20 MHz bandwidth, the rate of 0.92 Gbps (30.72e6*15*2) is required. When it comes to LTE-A with max 5 carries of up to 100 MHz, the rate is five times increased as 4.6 Gbps.

More receive antennas significantly increase the transmission rate on backhaul. For instance, in case of MIMO application with 8 element antennas, up to 7.36 Gbps (8*0.92 Gbps) on backhaul is required. With 100 MHz LTE-A system, the rate is significantly increased to 23 Gbps.

Latency becomes more serious when a backhaul network is getting complicated. For instance, when a BBU is connected with tens or hundreds of RRUs, point-to-point connections between the BBU and the RRUs are not cost efficient any more and a router-like device is deployed to make backhaul network economic. However, latency via router is sensitive and sometimes uncontrollable to incoming traffic from each RRU. Latency is typically getting large when traffic is in congestion status. Furthermore, different latency could result in synchronization problem on air-interface transmission/reception.

In view of the foregoing problems, there is a need to provide an improved solution for transmitting and receiving data between a source node and a destination node.

SUMMARY

According to a first aspect, embodiments herein provide a method in a source node for transmitting data in an OFDM system in which data are transmitted on frequency bands from the source node to a destination node. The method may comprise: selecting a set of frequency bands from available frequency bands in the OFDM system; and transmitting data in frequency domain on the selected set of frequency bands to the destination node.

According to a second aspect, embodiments herein provide a method at a destination node for receiving data in an OFDM system in which data are received on frequency bands from a source node. The method may comprise: determining a set of frequency bands of available frequency bands on which data are to be received in frequency domain; and receiving the data on the determined set of frequency bands from the source node.

According to a third aspect, embodiments herein provide an apparatus in a source node for transmitting data in an OFDM system in which data are transmitted on frequency bands from the source node to a destination node. The apparatus may comprise: a selecting means, configured to select a set of frequency bands from available frequency bands in the OFDM system; and a transmitting means, configured to transmit data in frequency domain on the selected set of frequency bands to the destination node.

According to a fourth aspect, embodiments herein provide an apparatus in a destination node for receiving data in an OFDM system in which data are received on frequency bands from a source node. The apparatus may comprise: a determining means, configured to determine a set of frequency bands of available frequency bands on which data are to be received in frequency domain; and a receiving means, configured to receive the data on the determined set of frequency bands from the source node.

Embodiments of the present disclosure provide an improved solution for transmitting and receiving data in an OFDM system. Compared with those existing solutions, the present disclosure may achieve more advantageous technical effects.

For example, embodiments of the present disclosure may communicate data in frequency domain from the source node to the destination node, which may efficiently reduce data traffic on backhaul compared with data communication in time domain. Further, embodiments of the present disclosure may alleviate latency caused by incoming traffic in case that a BBU connects to tens or hundreds of RRUs. Furthermore, embodiments of the present disclosure have low implementation complexity and are applicable to both downlink and uplink communications.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, wherein.

Throughout the figures, same or similar reference numbers indicates same or similar elements.

DETAILED DESCRIPTION

Various embodiments of the present disclosure are described in detail with reference to the drawings. The flowcharts and block diagrams in the figures illustrate the apparatus, method, as well as architecture, functions and operations executable by a computer program product according to the embodiments of the present disclosure. In this regard, each block in the flowcharts or block may represent a module, a program, or a part of codes, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

As described above, FIG. 1 illustrates a schematic diagram of an OFDM system.

Figure 1:
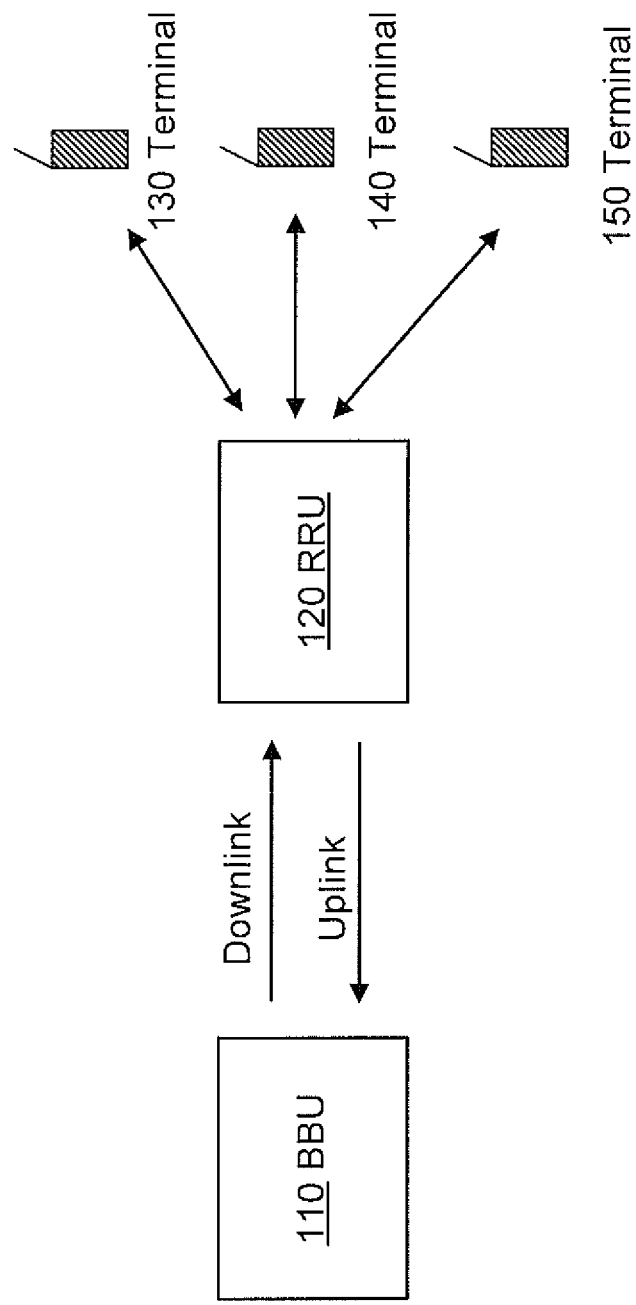
FIG. 1 illustrates a schematic diagram of an OFDM system.

The OFDM system of FIG. 1 is exemplarily shown as a LTE system. The OFDM system illustratively comprises a BBU 110 and a RRU 120. The communication from the BBU 110 to the RRU 120 is defined as downlink communication, and the communication from the RRU 120 to the BBU 110 is defined as uplink communication. The RRU 120 may communicate with user terminals 130, 140 and 150. Data transmitted from the BBU 110 to the RRU 120 in downlink may be processed at the RRU 120 and subsequently provided to the terminals 130, 140 and 150, and data provided from the terminals 130, 140 and 150 to the RRU 120 may be processed at the RRU 120 and subsequently transmitted from the RRU 120 to the BBU 110 in uplink. Embodiments of the present disclosure intend to improve data (such as I/Q data) communication between the BBU 110 and the RRU 120 both in downlink and uplink. In embodiments of the present disclosure, the source node and the destination node may be connected via a wire line. For example, a BBU may be connected to a RRU via a fiber. Accordingly, the communication between the source node and the destination node may be a wired communication. In embodiments of the present disclosure, frequency domain exchange in OFDM system is between BBU and RRU. The embodiment of FIG. 1 shows a scenario with a BBU connecting with a RRU (the RRU serves UEs), wherein the link between the BBU and the RRU is wireline, not wireless.

For better understanding, the following embodiments of the present disclosure are described under the LTE architecture, for example, in the OFDM system of FIG. 1. As can be appreciated by those skilled in the art, the present disclosure may be applicable to any other OFDM system such as WiMAX, WLAN, etc., and is not limited to a LTE system. In embodiments according to the present discourse, data in frequency domain, instead of time domain signals, are transmitted between the source node and the destination node.

Figure 2:
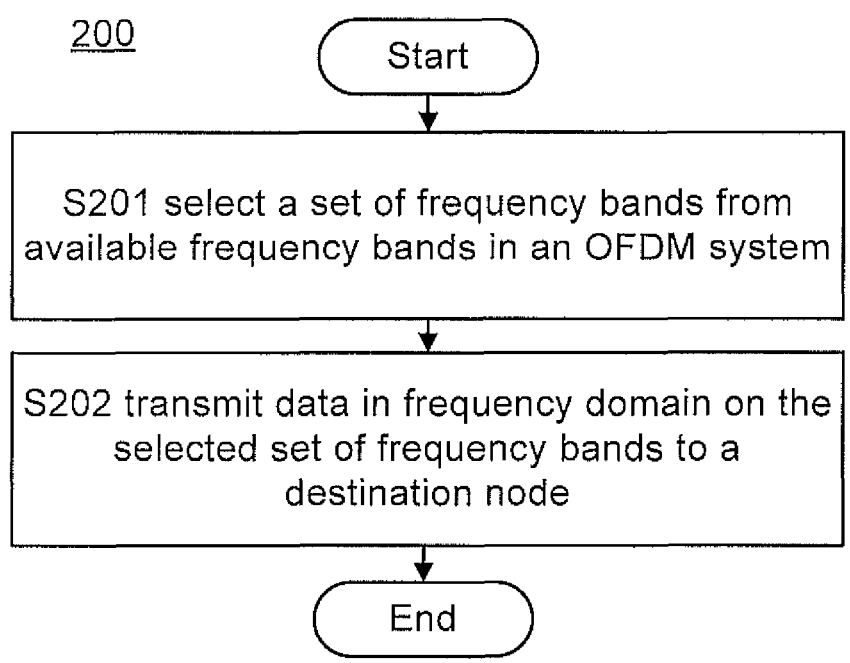
FIG. 2 illustrates a flow chart of a method in a source node for transmitting data in an OFDM system according to an embodiment of the disclosure.

FIG. 2 illustrates a flow chart of a method 200 in a source node for transmitting data in an OFDM system according to an embodiment of the disclosure. In the OFDM system, data are transmitted on frequency bands from a source node to a destination node.

As described above, in the present disclosure, the OFDM system may be a LTE system, a WiMAX system, a WLAN system, and so on. In case of the LTE system shown in FIG. 1, depending on downlink or uplink transmission, the source node may be a BBU or a RRU, and the destination node may also be a BBU or a RRU. Specifically, in the downlink transmission from a BBU to a RRU, the source node is the BBU and the destination node is the RRU; and in the uplink transmission from a RRU to a BBU, the source node is the RRU and the destination node is the BBU. Either the BBU or the RRU may be used as a source node to perform the method for transmitting data in an OFDM system according to the embodiment shown in FIG. 2. In embodiments of the present disclosure, a set of frequency bands may be first selected from available frequency bands in an OFDM system, and then data in frequency domain may be transmitted on the selected set of frequency bands between the BBU and the RRU. Thus, since the data are transmitted in frequency domain on the selected frequency bands instead of all available frequency bands, the transmitted data may be compressed.

At step S201, a set of frequency bands is selected from available frequency bands in the OFDM system.

According to an embodiment of the present disclosure, when the BBU is used as a source node to perform the method for transmitting data in an OFDM system according to the embodiment shown in FIG. 2, since the BBU has knowledge about frequency resource of the OFDM system, it may select a set of frequency bands from available frequency bands in an OFDM system based on its knowledge for better scheduling.

According to another embodiment of the present disclosure, when the RRU is used as a source node to perform the method for transmitting data in an OFDM system according to the embodiment shown in FIG. 2, the RRU may receive signals on the available frequency bands from at least one user terminal, calculate signal energy of the received signals, compare the calculated signal energy with a threshold, and then based on comparison result select the set of frequency bands from the available frequency bands.

There are several ways of determining the threshold. For example, the threshold may be preset by an operator, or may be determined by a noise level. As appreciated by those skilled in the art, noise levels may be different for different application scenarios, and there are existing methods for determining the threshold by a noise level.

According to another embodiment of the present disclosure, when the RRU is used as a source node to perform the method for transmitting data in an OFDM system according to the embodiment shown in FIG. 2, the RRU may detect information on a control channel, and select the set of frequency bands based on the detected information.

A control channel may be different depending on a specific OFDM system. For example, in a LTE system, the control channel may be the physical downlink control channel (PDCCH). In an embodiment, the RRU may receive from the BBU messages such as downlink assignment and uplink grant on PDCCH, from which the RRU may detect information about utilization of frequency resource in the OFDM system, and then the RRU may select the set of frequency bands from available frequency bands in the OFDM system according to the detected information about utilization of frequency resource.

At step S202, data in frequency domain are transmitted on the selected set of frequency bands to a destination node.

Conventionally, data are transmitted in time domain from a source node to a destination node, and all available frequency bands are used. According to embodiments of the present disclosure, the data are transmitted in frequency domain. Specifically, according to an embodiment of the present disclosure, data may be first converted from time domain to frequency domain before transmitting the data, and then the data may be encapsulated into the selected set of frequency bands for transmission. Thus, only the selected set of frequency bands is used for data transmission so that frequency resource in the OFDM system will have better utilization.

According to an embodiment of the present disclosure, the method in a source node for transmitting data in an OFDM system may further comprise steps of: generating an indication indicating the selected set of frequency bands; and sending the indication to the destination node. In an embodiment of the present disclosure, the indication is a bitmap. The bitmap may be generated by defining the bitmap having bits associated with the available frequency bands and configuring the bits in the bitmap to represent the selected set of frequency bands. In an embodiment of the present disclosure, a bit in the bitmap is associated with one frequency band or multiple frequency bands. This embodiment will be described in detail with reference to FIG. 3 as below.

Figure 3:
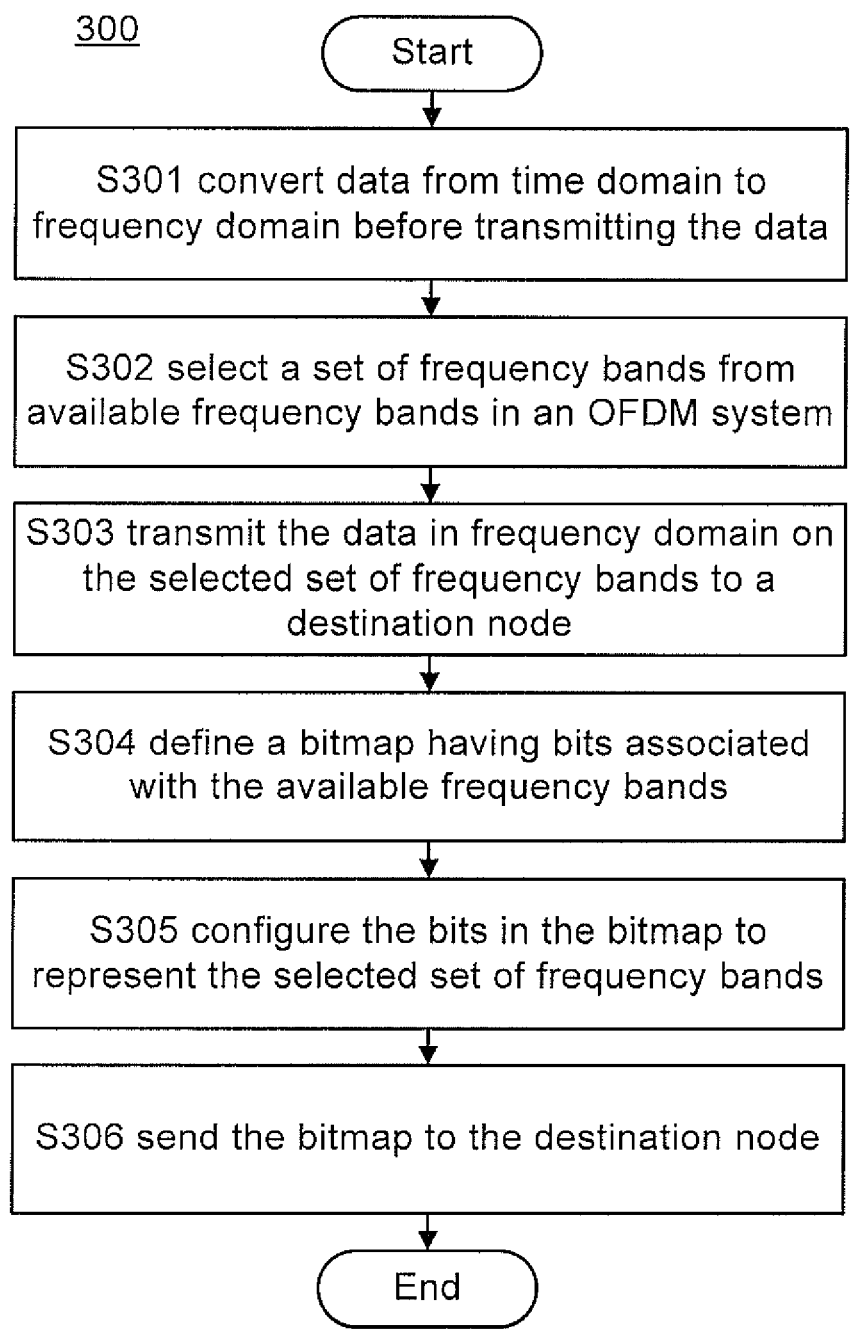
FIG. 3 illustrates a flow chart of a method in a source node for transmitting data in an OFDM system according to another embodiment of the disclosure.

FIG. 3 illustrates a flow chart of a method 300 in a source node for transmitting data in an OFDM system according to another embodiment of the disclosure. As mentioned above, data are transmitted in frequency domain from a source node to a destination node in the OFDM system.

Taken a LTE system as an example of the OFDM system in this embodiment, in a downlink transmission from a BBU to a RRU, the source node is the BBU and the destination node is a RRU; and in an uplink transmission from a RRU to a BBU, the source node is the RRU and the destination node is a BBU. Either a BBU or a RRU may be used as a source node to perform the method for transmitting data in an OFDM system according to the embodiment shown in FIG. 3.

At step S301, data are converted from time domain to frequency domain before transmitting the data.

As is known in the art, a Fourier transformation is usually used to convert data from time domain to frequency domain. It is to be noted that the Fourier transformation is only an example but not for limitation, those skilled in the art may employ any other suitable means to convert data from time domain to frequency domain.

At step S302, a set of frequency bands is selected from available frequency bands in an OFDM system. The step S302 may be performed similar to the step S201.

At step S303, data in frequency domain are transmitted on the selected set of frequency bands to a destination node.

According to an embodiment of the present disclosure, the selected set of frequency bands may be selected from available frequency bands in the OFDM system and may comprise one or more frequency bands, each frequency band may have same or different width and every two frequency bands may be adjacent or have an interval.

In a LTE system, the available frequency bands may be divided into several blocks with the minimal scheduling unit of physical resource block (PRB). One PRB consists of 12 subcarriers with each 15 KHz. Total 25, 50 and 100 PRBs are specified for a 5 MHz, 10 MHz and 20 MHz system, respectively. The available frequency bands in the a LTE system may be represented as N PRBs, namely, PRB #1, . . . PRB #N−1, PRB #N, and a set of frequency bands may be selected from the N PRBs. For example, PRB #1, PRB #2, . . . , and PRB #8 are selected as members of the set of frequency bands at step S302. So data converted from time domain to frequency domain at step S301 may be encapsulated into the selected 8 PRBs, i.e., into PRB #1, PRB #2, . . . and PRB #8, and then the data may be transmitted on the selected set of frequency bands to the destination node.

At step S304, a bitmap is defined having bits associated with the available frequency bands.

Steps S304 and S305 are used for generating an indication indicating the set of frequency bands selected at step S302. In this embodiment, the indication is a bitmap. Alternatively, many other indicators may be used as the indication, and the bitmap is only an example for better understanding of those skilled in the art rather than limitation.

As can be appreciated, a bitmap may have a plurality of bits. In accordance with an embodiment of the present disclosure, a bit in the bitmap is associated with one frequency band. For example, assuming the total number of the available frequency bands in the OFDM system is 100, a bitmap with 100 bits may be defined, where one bit in the bitmap is associated with one frequency band. There are may be several ways to implement the association, for example, one bit may be mapped into the associated available frequency band. Those skilled in the art will appreciated that any other suitable technical means is also applicable.

In accordance with another embodiment of the present disclosure, a bit in the bitmap is associated with multiple frequency bands, which is quite efficient in a system with large bandwidth. For example, assuming the total number of the available frequency bands in the OFDM system is 100, a bitmap with 25 bits may be defined, where one bit in the bitmap is associated with 4 frequency bands. Thus, a tradeoff between bitmap overhead and traffic load is provided.

At step S305, the bits in the bitmap are configured to represent the selected set of frequency bands.

In accordance with an embodiment of the present disclosure, a bit in the bitmap is associated with one frequency band. Assuming 8 frequency bands are selected into the set of frequency bands at step S302, 8 bits in the bitmap may be configured to represent the 8 frequency bands. The 8 bits may be set as a status of "valid" and other bits in the bitmap may be set as a status of "invalid". For example, "valid" and "invalid" may be represented by means of "1" and "0", "TRUE" and "FALSE", etc. For example, if "1" is used as a valid status, the 8 bits may be set as "1" and other bits in the bitmap may be set as "0"; or if "TRUE" is used as a valid status, the 8 bits may be set as "TRUE" and other bits in the bitmap may be set as "FALSE". As can be appreciated by those skilled in the art, if "0" is used as a valid status, the 8 bits may be set as "0" and other bits in the bitmap may be set as "1"; or if "FALSE" is used as a valid status, the 8 bits may be set as "FALSE" and other bits in the bitmap may be set as "TRUE".

In accordance with another embodiment of the present disclosure, a bit in the bitmap is associated with multiple frequency bands. Assuming 8 frequency bands are selected into the set of frequency bands at step S302, and assuming one bit in the bitmap is associated with 4 frequency bands, 2 bits in the bitmap may be configured to represent the 8 frequency bands. The 2 bits may be set as a status of "valid" and other bits in the bitmap may be set as a status of "invalid".

At step S306, the bitmap is sent to the destination node.

In an embodiment of the present application, the bitmap may be considered as a separate signal and be sent to the destination node independent from transmission of the data.

In an embodiment of the present application, the bitmap may be sent together with the data1. For example, the step S303 may be performed after the step S305, then the bitmap may be transmitted together with the data to the destination node. Specifically, the bitmap may be added into the header of data or any part of the data, so as to be transmitted to the destination node together with the data.

Figure 4:
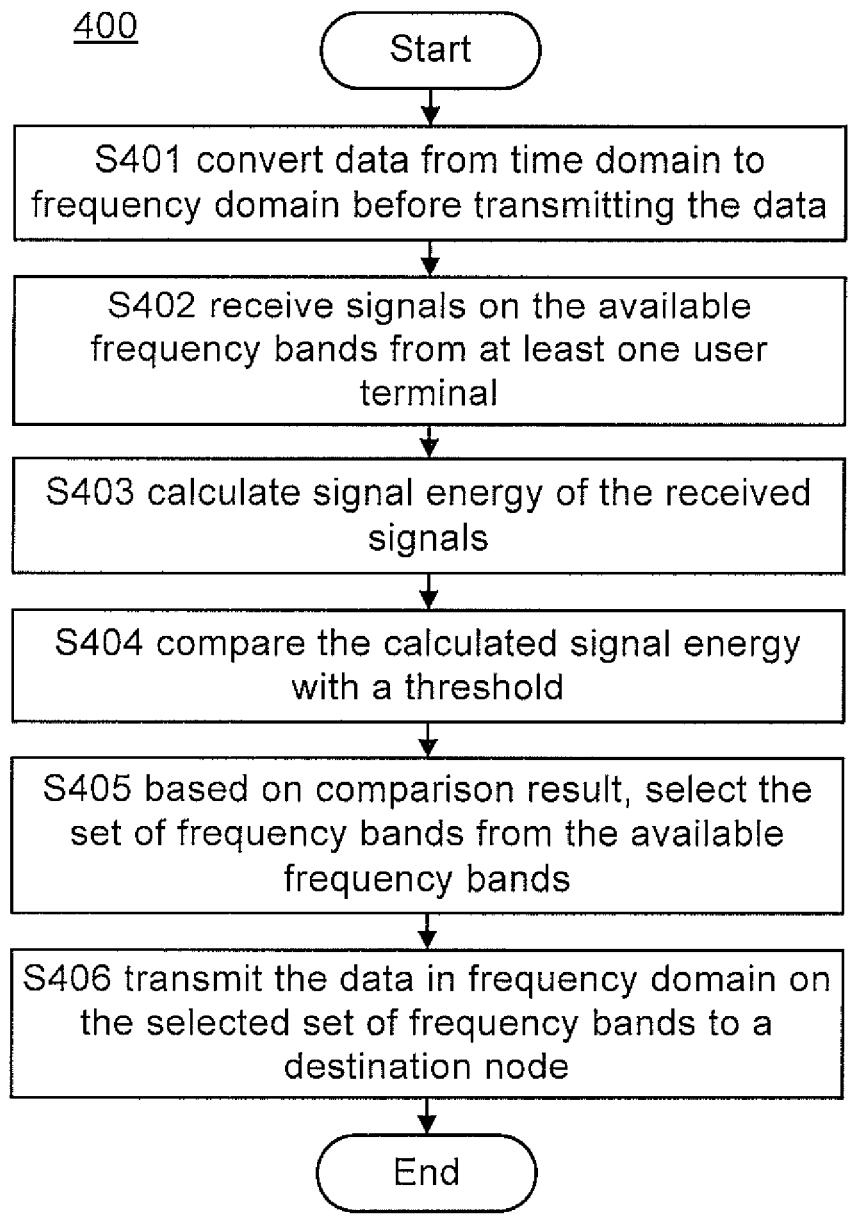
FIG. 4 illustrates a flow chart of a method in a source node for transmitting data in an OFDM system according to yet another embodiment of the disclosure.

FIG. 4 illustrates a flow chart of a method 400 in a source node for transmitting data in an OFDM system according to yet another embodiment of the disclosure. As mentioned above, data are transmitted on frequency bands from a source node to a destination node in the OFDM system.

Taken a LTE system shown in FIG. 1 as an example of the OFDM system in this embodiment, in a downlink transmission from a BBU to a RRU, the source node is the BBU and the destination node is a RRU; and in an uplink transmission from a RRU to a BBU, the source node is the RRU and the destination node is a BBU. The method of FIG. 4 is applied to the case that the RRU is a source node.

At step S401, data are converted from time domain to frequency domain before transmitting the data.

At step S402, signals on the available frequency bands are received from at least one user terminal.

As shown in FIG. 1, in both downlink and uplink communication between the BBU 110 and the RRU 120, the user terminals 130, 140 and 150 may involve in the communication with RRU 120. As both of communication between the BBU 110 and the RRU 120 and communication between the RRU 120 and the user terminals 130, 140 and 150 utilize the frequency resource in the OFDM system, the RRU 120 may select a set of frequency bands from available frequency bands in the OFDM system based on signals on the available frequency bands from at least one of the user terminals 130, 140 and 150.

At step S403, signal energy of the received signals is calculated.

Signal energy may be calculated as amplitude, power, or any other suitable measurement of the received signals. Those skilled in the art will calculate signal energy of the received signals based on their existing knowledge.

At step S404, the calculated signal energy is compared with a threshold.

According to an embodiment of the present application, the threshold is determined by a noise level. There are several ways of determining the threshold. For example, the threshold may be preset by an operator, or may be determined by a noise level. As appreciated by those skilled in the art, noise levels may be different for different application scenarios, and there are existing methods for determining the threshold by a noise level.

The signal energy calculated at step S403 may show energy of signals on each available frequency bands. By comparing the calculated signal energy with a threshold, it may be easily seen which one of the available frequency bands has stronger signal energy.

At step S405, the set of frequency bands is selected from the available frequency bands based on comparison result.

Based on comparison result, it is clear that which available frequency band has a signal energy exceeding the threshold. If a signal energy exceeds the threshold, it may be determined that the frequency band corresponding to the signal energy has stronger signal energy. Thus, this frequency band may be selected as a member of the set of frequency bands. By comparing signal energy of each frequency band of the available frequency bands with the threshold, those frequency band(s) with stronger signal energy may be selected from the available frequency bands. The selected frequency band(s) constitutes the set of frequency bands.

At step S406, data in frequency domain are transmitted on the selected set of frequency bands to a destination node.

The step S406 is similar to the steps S202 and S303, so all the details described at the steps S202 and S303 are also applicable to the step S406.

Figure 5:
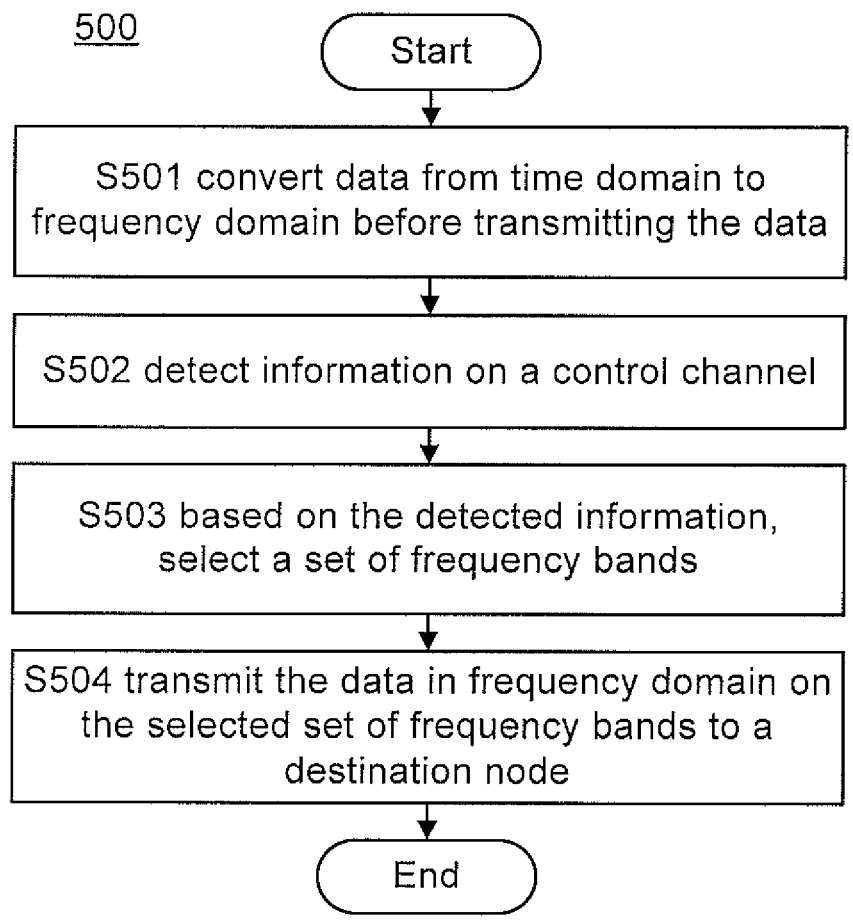
FIG. 5 illustrates a flow chart of a method in a source node for transmitting data in an OFDM system according to a further embodiment of the disclosure.

FIG. 5 illustrates a flow chart of a method 500 in a source node for transmitting data in an OFDM system according to a further embodiment of the disclosure. As mentioned above, data are transmitted on frequency bands from a source node to a destination node in the OFDM system.

Taken a LTE system as an example of the OFDM system in this embodiment, in a downlink transmission from a BBU to a RRU, the source node is the BBU and the destination node is a RRU; and in an uplink transmission from a RRU to a BBU, the source node is the RRU and the destination node is a BBU. The method of FIG. 5 is applied to the case of the RRU being a source node.

At step S501, data are converted from time domain to frequency domain before transmitting the data.

At step S502, information on a control channel is detected.

The control channel may be various depending on specific OFDM systems. For example, in a LTE system, the control channel may be PDCCH.

In LTE, downlink assignment and uplink grant are both transmitted on PDCCH, where information about frequency resource utilization is indirectly indicated in downlink assignments and uplink grants and it may be detected by decoding PDCCH. The RRU may decode PDCCH and detect the information on which frequency band(s) in the available frequency bands in the OFDM system has be used to transmit data.

At step S503, a set of frequency bands is selected based on the detected information.

As mentioned above, information about utilization of frequency resource in the OFDM system may be detected on a control channel, such as PDCCH. Therefore, it is easy to obtain from the detected information which frequency band(s) in the available frequency bands in the OFDM system may be used to transmit data. Thus, such frequency band(s) may be selected as the set of frequency bands to transmit the data converted at step S501.

At step S504, data in frequency domain are transmitted on the selected set of frequency bands to a destination node.

The step S504 is similar to the steps S202, S303 and S406, so all the details described at the steps S202, S303 and S406 are also applicable to the step S504.

Figure 6:
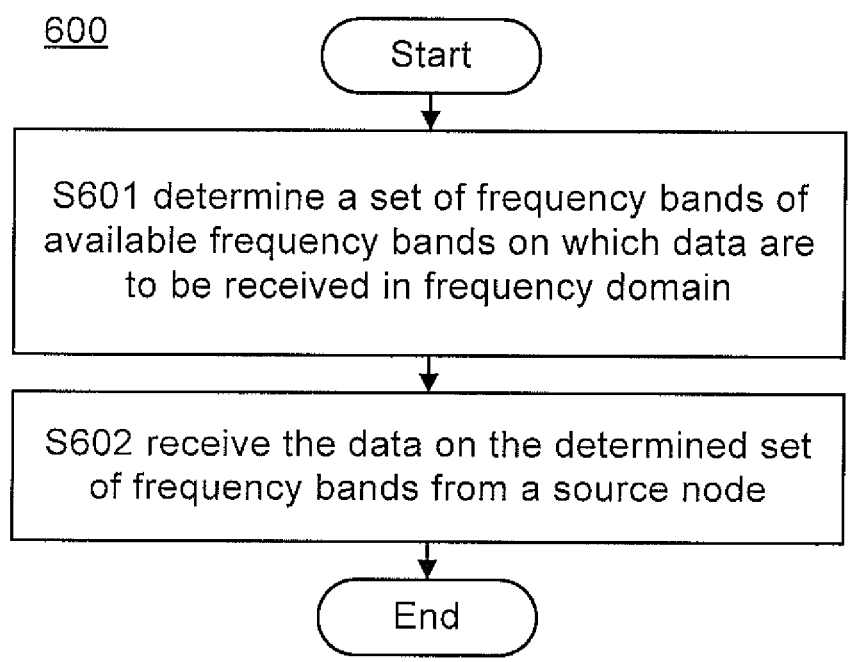
FIG. 6 illustrates a flow chart of a method at a destination node for receiving data in an OFDM system according to an embodiment of the disclosure.

FIG. 6 illustrates a flow chart of a method 600 at a destination node for receiving data in an OFDM system according to an embodiment of the disclosure. In the OFDM system, data are received on frequency bands from a source node.

As described above, in the present disclosure, the OFDM system may be a LTE system, a WiMAX system, a WLAN system, and so on. In case of the LTE system shown in FIG. 1, depending on the downlink or uplink transmission, the source node may be a BBU or a RRU, and the destination node may also be a BBU or a RRU. Specifically, in a downlink transmission from a BBU to a RRU, the source node is the BBU and the destination node is the RRU; and in an uplink transmission from a RRU to a BBU, the source node is the RRU and the destination node is the BBU. Either a BBU or a RRU may be used as a destination node to perform the method for receiving data in an OFDM system according to the embodiment shown in FIG. 6.

At step S601, determine a set of frequency bands of available frequency bands on which data are to be received in frequency domain.

According to one embodiment of the present disclosure, an indication, which indicates the set of frequency bands on which data are to be received in frequency domain, is received; and the set of frequency bands on which data are to be received in frequency domain is obtained based on the received indication. In an implementation, the indication is a bitmap having bits associated with the available frequency bands, and the bits in the bitmap have been configured to represent the set of frequency bands. In an implementation, a bit in the bitmap is associated with one frequency band or multiple frequency bands. This embodiment will be described in detail with reference to FIG. 7.

According to another embodiment of the present disclosure, when a RRU may be used as a destination node to perform the method for receiving data in an OFDM system shown in FIG. 6, information on a control channel is received, and the set of frequency bands is determined based on the received information. This embodiment will be described in detail with reference to FIG. 8.

At step S602, the data on the determined set of frequency bands are received from a source node.

Conventionally, data in time domain are received, and all available frequency bands are used. Differently, in the present disclosure, data in frequency domain are received from the determined set of frequency bands so that frequency resource in the OFDM system will have better utilization. Further, according to an embodiment of the present disclosure, the data received at step S602 may be converted from frequency domain to time domain.

Figure 7:
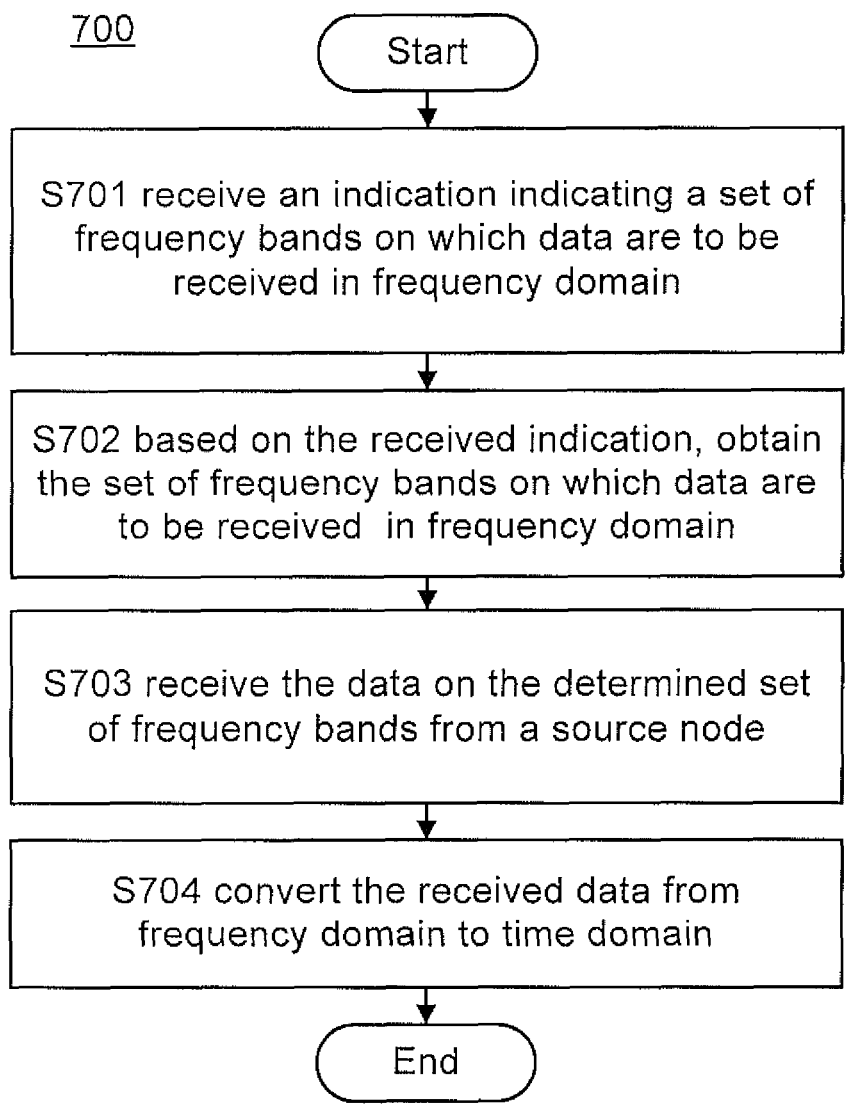
FIG. 7 illustrates a flow chart of a method at a destination node for receiving data in an OFDM system according to another embodiment of the disclosure.

FIG. 7 illustrates a flow chart of a method 700 at a destination node for receiving data in an OFDM system according to another embodiment of the disclosure. As mentioned above, data are received on frequency bands from a source node in the OFDM system.

Taken a LTE system as an example of the OFDM system in this embodiment, in a downlink transmission from a BBU to a RRU, the source node is the BBU and the destination node is a RRU; and in an uplink transmission from a RRU to a BBU, the source node is the RRU and the destination node is a BBU. Either a BBU or a RRU may be used as a destination node to perform the method for receiving data in an OFDM system according to the embodiment shown in FIG. 7.

At step S701, an indication, indicating a set of frequency bands on which data are to be received in frequency domain, is received.

In accordance with an embodiment of the present disclosure, a bit of a bitmap may be associated with one available frequency band as follows. For example, assuming the total number of the available frequency bands in the OFDM system is 100, a bitmap with 100 bits may be defined, where one bit in the bitmap is associated with one frequency band. Assuming 8 frequency bands are selected into the set of frequency bands, 8 bits in the bitmap may be configured to represent the 8 frequency bands. The 8 bits may be set as a status of "valid" and other bits in the bitmap may be set as a status of "invalid". For example, "valid" and "invalid" may be represented by means of "1" and "0", "TRUE" and "FALSE", etc.

In accordance with another embodiment of the present disclosure, a bit in the bitmap is associated with multiple frequency bands as follows. For example, assuming the total number of the available frequency bands in the OFDM system is 100, a bitmap with 25 bits may be defined, where one bit in the bitmap is associated with 4 frequency bands. Assuming 8 frequency bands are selected into the set of frequency bands, 2 bits in the bitmap may be configured to represent the 8 frequency bands.

In the embodiment of FIG. 7, it is assumed that the indication is a bitmap, and the bitmap has 8 bits configured to represent 8 frequency bands.

In the present disclosure, the indication may be embodied as various forms. According to an embodiment of the present disclosure, the indication is a bitmap having bits associated with the available frequency bands, and the bits in the bitmap have been configured to represent the set of frequency bands. Alternatively, many other indicators may be used as the indication, and the bitmap is only an example for better understanding of those skilled in the art rather than limitation.

At step S702, the set of frequency bands on which data are to be received in frequency domain is obtained based on the received indication.

As mentioned above, in the embodiment of FIG. 7, the indication is a bitmap and the bitmap has 8 bits configured to represent 8 frequency bands. Therefore, it may be obtained that the set of frequency bands is composed of the 8 frequency bands represented by the bitmap.

At step S703, the data on the determined set of frequency bands are received from a source node.

Having obtained the set of frequency bands at step S702, the data on the determined set of frequency bands may be easily identified and received from the source node. It is to be noted that the received data on the determined set of frequency bands are in frequency domain rather than time domain.

At step S704, the received data are converted from frequency domain to time domain.

As is known in the art, a Fourier transformation is common means for converting data from time domain to frequency domain. Correspondingly, an inverse Fourier transformation is commonly used for converting data from frequency domain to time domain. As mentioned above, an inverse Fourier transformation is commonly used for converting data from frequency domain to time domain. Thus, the received data may be converted from frequency domain to time domain by an inverse Fourier transformation. It is to be noted that the inverse Fourier transformation is only an example but not for limitation, those skilled in the art may employ other suitable means to convert data from time domain to frequency domain.

Figure 8:
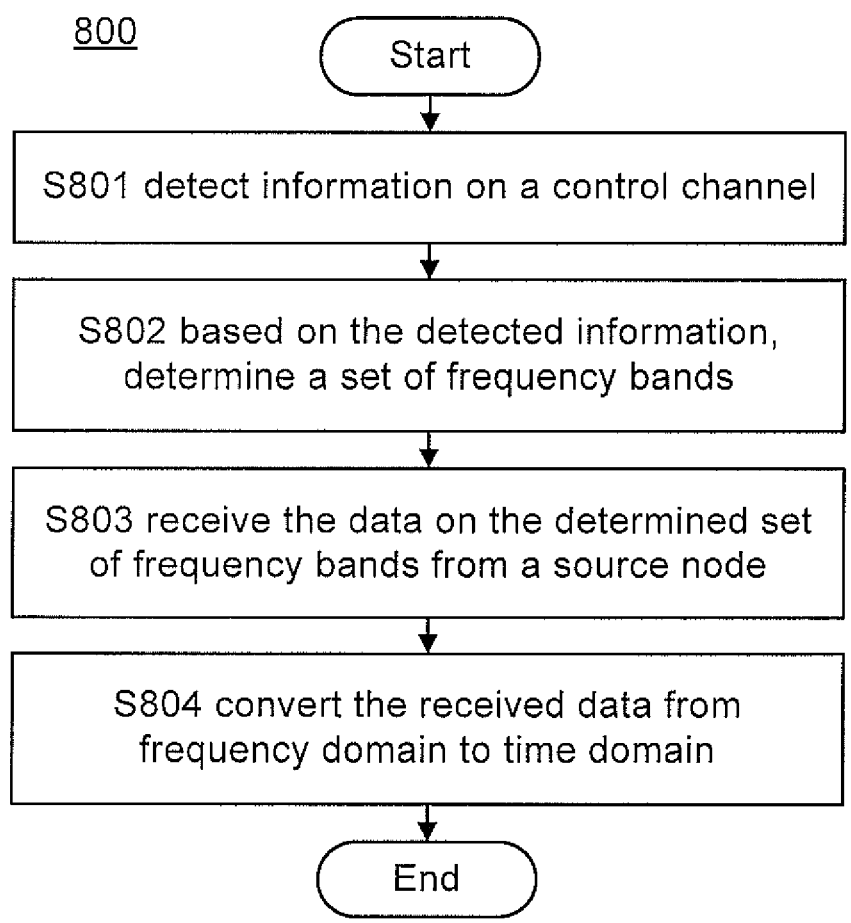
FIG. 8 illustrates a flow chart of a method at a destination node for receiving data in an OFDM system according to yet another embodiment of the disclosure.

FIG. 8 illustrates a flow chart of a method 800 at a destination node for receiving data in an OFDM system according to yet another embodiment of the disclosure. As mentioned above, data are received on frequency bands from a source node in the OFDM system.

Taken a LTE system as an example of the OFDM system in this embodiment, in a downlink transmission from a BBU to a RRU, the source node is the BBU and the destination node is a RRU; and in an uplink transmission from a RRU to a BBU, the source node is the RRU and the destination node is a BBU. The method of FIG. 8 is applied to the case that a RRU is a destination node.

At step S801, information on a control channel is detected.

The control channel may be various depending on specific OFDM systems. For example, in a LTE system, the control channel may be PDCCH.

In LTE, downlink assignment and uplink grant are both transmitted on PDCCH, where information about frequency resource utilization is indicated in downlink assignments and uplink grants and it may be detected by decoding PDCCH. The RRU may decode PDCCH and detect the information on which frequency band(s) in the available frequency bands in the OFDM system has be used to transmit data. It is to be noted that there are several ways to detect such information in the prior art, and any of them may be used herein.

At step S802, a set of frequency bands is determined based on the detected information.

As mentioned above, information about utilization of frequency resource in the OFDM system may be detected on a control channel, such as PDCCH. Therefore, it is easy to obtain from the detected information which frequency band (s) in the available frequency bands in the OFDM system have been used to transmit data. Thus, such frequency band(s) may be determined as the set of frequency bands.

At step S803, the data on the determined set of frequency bands are received from a source node.

The step S803 is similar to the steps S602 and S703, so all the details described at the steps S602 and S703 are also applicable to the step S803.

At step S804, the received data are converted from frequency domain to time domain.

The step S804 is similar to the step S704, so all the details described at the step S704 are also applicable to the step S804.

Figure 9:
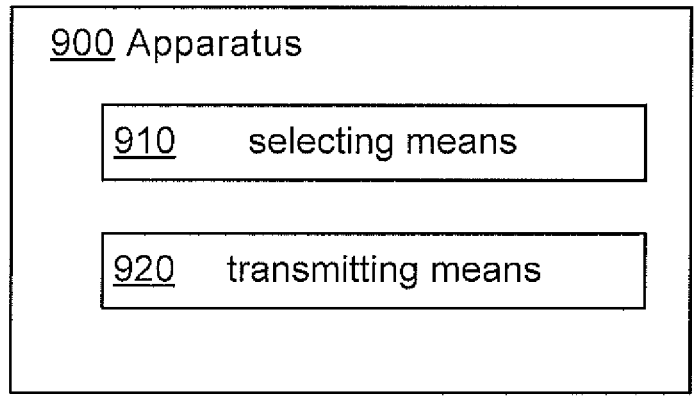
FIG. 9 illustrates block diagrams of an apparatus in a source node for transmitting data in an OFDM system according to an embodiment of the disclosure.

FIG. 9 illustrates block diagrams of an apparatus 900 in a source node for transmitting data in an OFDM system according to an embodiment of the disclosure. In the OFDM system, data are transmitted on frequency bands from the source node to a destination node. As shown, the apparatus 900 comprises a selecting means 910 and a transmitting means 920. In an embodiment of the present disclosure, the selecting means 910 is configured to select a set of frequency bands from available frequency bands in the OFDM system; and the transmitting means 920 is configured to transmit data in frequency domain on the selected set of frequency bands to the destination node.

It is noted that the apparatus 900 may be configured to implement functionalities as described with reference to FIGS. 2, 3, 4 and 5. Therefore, the features discussed with respect to methods 200, 300, 400 and 500 apply to the corresponding components of the apparatus 900. It is further noted that the components of the apparatus 900 may be embodied in hardware, software, firmware, and/or any combination thereof. For example, the selecting means 910 may be implemented by a circuit, a processor or any other appropriate selection device; and the transmitting means 920 may be implemented by a circuit, a processor, a transceiver, a transmitter and so on. Those skilled in the art will appreciate that the aforesaid examples are only for illustration not limitation.

Figure 10:
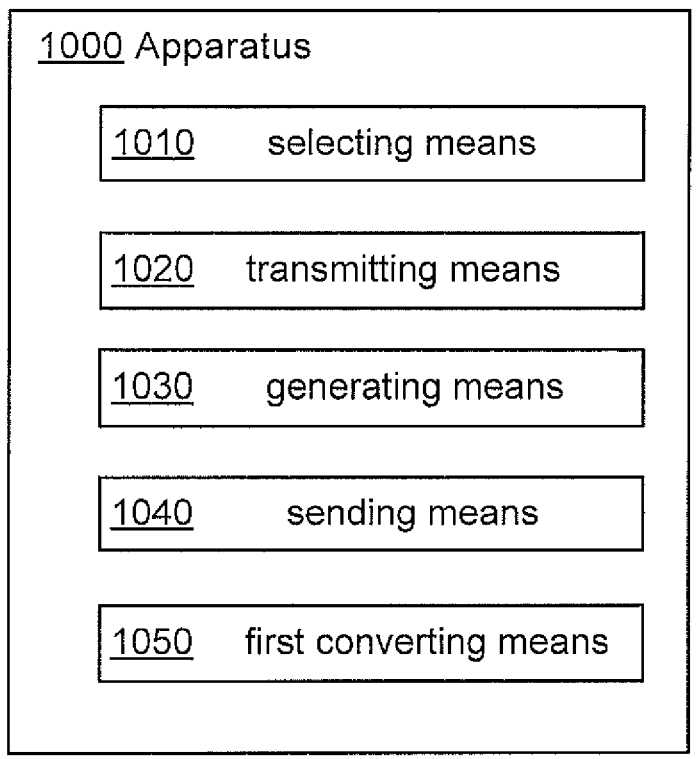
FIG. 10 illustrates block diagrams of an apparatus in a source node for transmitting data in an OFDM system according to another embodiment of the disclosure.

FIG. 10 illustrates block diagrams of an apparatus 1000 in a source node for transmitting data in an OFDM system according to another embodiment of the disclosure. In the OFDM system, data are transmitted on frequency bands from the source node to a destination node. In some embodiment of the present disclosure, the apparatus 1000 may comprise: a selecting means 1010, configured to select a set of frequency bands from available frequency bands in the OFDM system; a transmitting means 1020, configured to transmit data in frequency domain on the selected set of frequency bands to the destination node, a generating means 1030, configured to generate an indication indicating the selected set of frequency bands; and a sending means 1040, configured to send the indication to the destination node. In some embodiment of the present disclosure, the apparatus 1000 may further comprise: a first converting means 1050, configured to convert the data from time domain to frequency domain before transmitting the data.

In some embodiment of the present disclosure, the indication is a bitmap, and the generating means 1030 comprises: means configured to define the bitmap having bits associated with the available frequency bands; and means configured to configure the bits in the bitmap to represent the selected set of frequency bands.

In some embodiment of the present disclosure, a bit in the bitmap is associated with one or multiple frequency bands.

In some embodiment of the present disclosure, the source node is a BBU and the destination node is a RRU.

In some embodiment of the present disclosure, the source node is a RRU and the destination node is a BBU.

In some embodiment of the present disclosure, the source node is a RRU and the destination node is a BBU, and the selecting means 1010 comprises: means configured to detect information on a control channel; and means configured to, based on detected information, select the set of frequency bands.

In some embodiment of the present disclosure, the source node is a RRU and the destination node is a BBU, and the selecting means 1010 comprises: means configured to receive signals on the available frequency bands from at least one user terminal; means configured to receive calculate signal energy of the received signals; means configured to compare the calculated signal energy with a threshold; and means configured to based on comparison result, select the set of frequency bands from the available frequency bands. The threshold may be determined by a noise level.

It is noted that the components of the apparatus 1000 may be embodied in hardware, software, firmware, and/or any combination thereof. For example, the selecting means 1010, the transmitting means 1020, the generating means 1030, the sending means 1040 and the first converting means 1050 may be implemented by a circuit, a processor, a transceiver, a transmitter and/or other appropriate device. Those skilled in the art will appreciate that the aforesaid examples are only for illustration not limitation.

In some embodiment of the present disclosure, the apparatus 900 and/or the apparatus 1000 comprise at least one processor. The at least one processor suitable for use with embodiments of the present disclosure may include, by way of example, both general and special purpose processors already known or developed in the future. The apparatus 900 and/or the apparatus 1000 further comprise at least one memory. The at least one memory may include, for example, semiconductor memory devices, e.g., RAM, ROM, EPROM, EEPROM, and flash memory devices. The at least one memory may be used to store program of computer executable instructions. The program may be written in any high-level and/or low-level compilable or interpretable programming languages. In accordance with embodiments, the computer executable instructions may be configured, with the at least one processor, to cause the apparatus 900 and/or the apparatus 1000 to at least perform according to methods 200, 300, 400 and 500 as discussed above.

Figure 11:
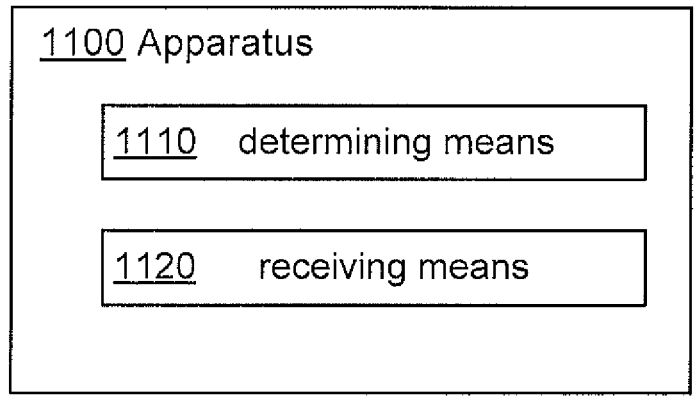
FIG. 11 illustrates block diagrams of an apparatus in a destination node for receiving data in an OFDM system according to an embodiment of the disclosure.

FIG. 11 illustrates block diagrams of an apparatus 1100 in a destination node for receiving data in an OFDM system according to an embodiment of the disclosure. In the OFDM system, data are received on frequency bands from a source node. As shown, the apparatus 1100 comprises a determining means 1110 and a receiving means 1120. In an embodiment of the present disclosure, the determining means 1110 is configured to determine a set of frequency bands of available frequency bands on which data are to be received in frequency domain; and the receiving means 1120 is configured to receive the data on the determined set of frequency bands from the source node.

It is noted that the apparatus 1100 may be configured to implement functionalities as described with reference to FIGS. 6, 7 and 8. Therefore, the features discussed with respect to methods 600, 700 and 800 apply to the corresponding components of the apparatus 1100. It is further noted that the components of the apparatus 1100 may be embodied in hardware, software, firmware, and/or any combination thereof. For example, the determining means 1110 may be implemented by a circuit, a processor, a determiner or any other appropriate device; and the receiving means 1120 may be implemented by a circuit, a processor, a transceiver, a receiver and so on. Those skilled in the art will appreciate that the aforesaid examples are only for illustration not limitation.

Figure 12:
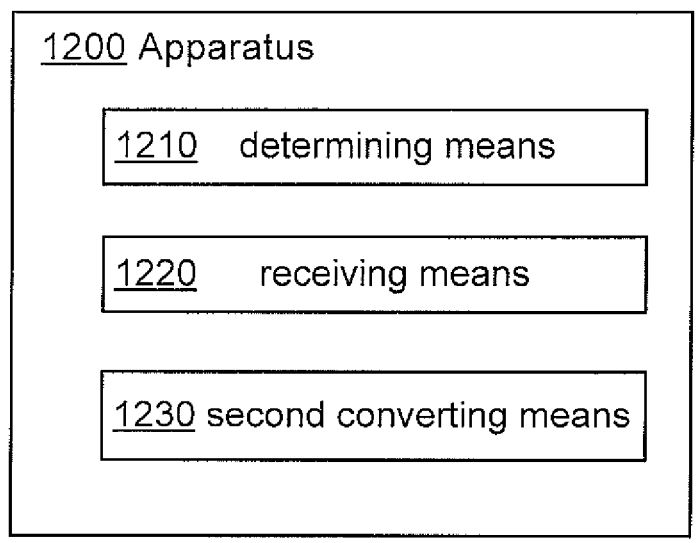
FIG. 12 illustrates block diagrams of an apparatus in a destination node for receiving data in an OFDM system according to another embodiment of the disclosure.

FIG. 12 illustrates block diagrams of an apparatus 1200 in a destination node for receiving data in an OFDM system according to another embodiment of the disclosure. In the OFDM system, data are received on frequency bands from a source node. As shown, the apparatus 1200 a determining means 1210, a receiving means 1220 and a second converting means 1230.

In some embodiment of the present disclosure, the determining means 1210 is configured to determine a set of frequency bands of available frequency bands on which data are to be received in frequency domain; the receiving means 1220 is configured to receive the data on the determined set of frequency bands from the source node; and the second converting means 1230 is configured to convert the received data from frequency domain to time domain.

In some embodiment of the present disclosure, the determining means 1210 comprises: means configured to receive an indication indicating the set of frequency bands which data are to be received in frequency domain; and means configured to, based on the received indication, obtain the set of frequency bands on which data are to be received in frequency domain.

In some embodiment of the present disclosure, the indication is a bitmap having bits associated with the available frequency bands; and the bits in the bitmap have been configured to represent the set of frequency bands.

In some embodiment of the present disclosure, a bit in the bitmap is associated with one or multiple frequency bands.

In some embodiment of the present disclosure, the destination node is a BBU and the source node is a RRU.

In some embodiment of the present disclosure, the destination node is a RRU and the source node is a BBU.

In some embodiment of the present disclosure, the destination node is a RRU and the source node is a BBU and the determining means 1210 comprises: means configured to receive information on a control channel; and means configured to, based on the received information, determining the set of frequency bands.

It is noted that the components of the apparatus 1100 may be embodied in hardware, software, firmware, and/or any combination thereof. For example, the determining means 1210 and the second converting means 1230 may be implemented by a circuit, a processor and/or any other appropriate device; the receiving means 1220 may be implemented by a circuit, a processor, a transceiver, a receiver and so on. Those skilled in the art will appreciate that the aforesaid examples are only for illustration not limitation.

In some embodiment of the present disclosure, the apparatus 1100 and/or the apparatus 1200 comprise at least one processor. The at least one processor suitable for use with embodiments of the present disclosure may include, by way of example, both general and special purpose processors already known or developed in the future. The apparatus 1100 and/or the apparatus 1200 further comprise at least one memory. The at least one memory may include, for example, semiconductor memory devices, e.g., RAM, ROM, EPROM, EEPROM, and flash memory devices. The at least one memory may be used to store program of computer executable instructions. The program may be written in any high-level and/or low-level compilable or interpretable programming languages. In accordance with embodiments, the computer executable instructions may be configured, with the at least one processor, to cause the apparatus 1100 and/or the apparatus 1200 to at least perform according to methods 600, 700 and 800 as discussed above.

Although some embodiments of this disclosure are described under LTE architecture, this disclosure may be applicable to other systems, such as 2G telecom system, WiMAX, and WLAN.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 2-8 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method in a remote radio unit, in an Orthogonal Frequency-Division Multiplexing (OFDM) system, for sending data to a baseband processing unit, the method comprising:
   receiving data from one or more user terminals using OFDM radio communications;
   converting the received data from time domain to frequency domain before sending the data to the baseband processing unit;
   identifying a subset of frequency bands, from among frequency bands in the OFDM system available for use by the remote radio unit, that carried the received data from the one or more user terminals for a given time period;
   generating an indication indicating the identified subset of frequency bands, wherein the indication is a bitmap, and wherein generating the indication comprises defining the bitmap having bits associated with the available frequency bands and configuring the bits in the bitmap to represent the identified subset of frequency bands;
   sending the converted data, in frequency domain, for only the identified subset of frequency bands, to the baseband processing unit; and
   sending the indication to the baseband processing unit.

2. The method of claim 1, wherein identifying the subset of frequency bands comprises:
   detecting information on a control channel; and
   based on the detected information, identifying the subset of frequency bands.

3. The method of claim 1, wherein identifying the subset of frequency bands comprises:
   receiving signals on the available frequency bands from at least one user terminal;
   calculating signal energy of the received signals;
   comparing the calculated signal energy with a threshold; and
   based on the comparing, identifying the subset of frequency bands from the available frequency bands.

4. The method of claim 3, wherein the threshold is determined by a noise level.

5. A method in a baseband processing unit, in an Orthogonal Frequency-Division Multiplexing (OFDM) system, for sending data to a remote radio unit for transmission to one or more user terminals using OFDM, the method comprising:

identifying a subset of frequency bands, from among frequency bands in the OFDM system available for use by the remote radio unit, that will carry data for a given period when the data is transmitted to the one or more user terminals by the remote radio unit;

generating an indication indicating the identified subset of frequency bands, wherein the indication is a bitmap, and wherein generating the indication comprises defining the bitmap having bits associated with the available frequency bands and configuring the bits in the bitmap to represent the identified subset of frequency bands;

sending the data, in frequency domain, for only the identified subset of frequency bands, to the remote radio unit; and sending the indication to the baseband processing unit, wherein the remote radio unit converts the data from frequency domain to time domain before transmitting the data to the one or more user terminals.

6. A method at a remote radio unit, in an Orthogonal Frequency-Division Multiplexing (OFDM) system, for receiving data from a baseband processing unit to be transmitted to one or more user terminals using OFDM, the method comprising:

identifying a subset of frequency bands, from among frequency bands available for use by the remote radio unit, for which data are to be received, in frequency domain, from the baseband processing unit, for a given period, wherein identifying the subset of frequency bands of available frequency bands comprises:

receiving an indication indicating the subset of frequency bands for which data are to be received in frequency domain, wherein the indication is a bitmap having bits associated with the available frequency bands and the bits in the bitmap have been configured to represent the subset of frequency bands; and based on the received indication, obtaining the subset of frequency bands for which the data are to be received in frequency domain;

receiving the data on only the identified subset of frequency bands from the baseband processing unit;

converting the data from frequency domain to time domain after receiving the data; and transmitting the converted data, in the time domain, to the one or more user terminals using OFDM.

7. An apparatus in a remote radio unit, in an Orthogonal Frequency-Division Multiplexing (OFDM) system, for sending data to a baseband processing unit, the apparatus comprising:

a radio circuit configured to receive data from one or more user terminals using OFDM radio communications;

an interface circuit configured to communicate with the baseband processing unit; and a processing circuit configured to:

convert the data received from the one or more user terminals from time domain to frequency domain, before sending the data to the baseband processing unit;

identify a subset of frequency bands, from among frequency bands in the OFDM system available for use by the remote radio unit, that carried the received data from the one or more user terminals for a given time period;

generate an indication indicating the identified subset of frequency bands, wherein the indication is a bitmap, wherein generating the indication comprises defining the bitmap having bits associated with the available frequency bands and configuring the bits in the bitmap to represent the identified subset of frequency bands;

send the converted data, in frequency domain, for only the identified subset of frequency bands, to the baseband processing unit; and send the indication to the baseband processing unit.

8. The apparatus of claim 7, wherein the processing circuit is further configured to:

receive signals on the available frequency bands from at least one user terminal;

calculate signal energy of the received signals;

compare the calculated signal energy with a threshold; and based on the comparing, identify the subset of frequency bands from the available frequency bands.

9. An apparatus in a baseband processing unit, in an Orthogonal Frequency-Division Multiplexing (OFDM) system, for sending data to a remote radio unit for transmission to one or more user terminals using OFDM, the apparatus comprising:

an interface circuit configured to communicate with the remote radio unit; and a processing circuit configured to:

identify a subset of frequency bands, from among frequency bands in the OFDM system available for use by the remote radio unit, that will carry data for a given period when the data is transmitted to the one or more user terminals by the remote radio unit;

generate an indication indicating the identified subset of frequency bands, wherein the indication is a bitmap, wherein generating the indication comprises defining the bitmap having bits associated with the available frequency bands and configuring the bits in the bitmap to represent the identified subset of frequency bands;

send the data, in frequency domain, for only the identified subset of frequency bands, to the remote radio unit; and send the indication to the baseband processing unit, wherein the remote radio unit converts the data from frequency domain to time domain before transmitting the data to the one or more user terminals.

* * * * *